Dec. 18, 1951     F. HANSHAW     2,578,930
FOWL PICKER

Filed June 24, 1947     2 SHEETS—SHEET 1

INVENTOR.
Fred Hanshaw.
BY
Harness, Dickey & Pierce
ATTORNEYS.

Dec. 18, 1951     F. HANSHAW     2,578,930
FOWL PICKER
Filed June 24, 1947     2 SHEETS—SHEET 2
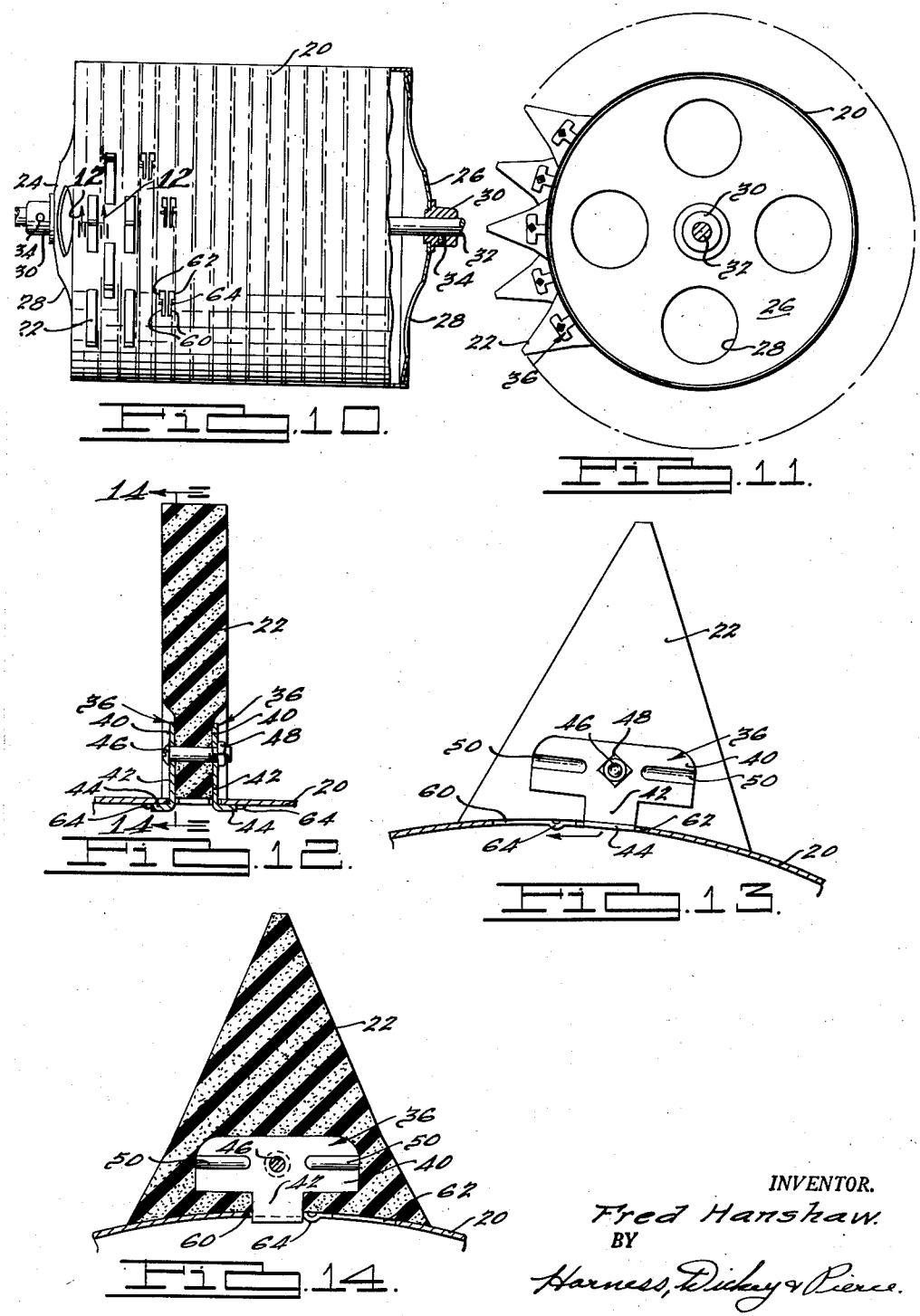
INVENTOR.
Fred Hanshaw.
BY
Harness, Dickey & Pierce.
ATTORNEYS.

Patented Dec. 18, 1951

2,578,930

UNITED STATES PATENT OFFICE 2,578,930

FOWL PICKER

Fred Hanshaw, Port Huron, Mich.

Application June 24, 1947, Serial No. 756,619

7 Claims. (Cl. 17—11.1)

This invention relates broadly to new and useful improvements in fowl picking apparatus of the type shown in my prior Patent No. 2,314,700 and is concerned primarily with a novel drum assembly having provisions for fastening the rubber feather picking teeth individually on the drum.

An important object of the present invention is to provide an apparatus of the above-mentioned character wherein the drum assembly is simple but rugged in construction and relatively inexpensive to manufacture.

Another object of the invention is to provide a novel mounting for holding the feather picking teeth individually and separately on the drum.

Still another object of the invention is to provide mountings for the feather picking teeth which permit the latter to be easily and quickly removed from or applied to the drum.

Further objects and advantages of the invention will be apparent during the course of the following description.

In the drawing, forming a part of this specification and wherein like numerals are employed to designate like parts throughout the same:

Fig. 1 is a plan view of a drum assembly embodying the invention, a portion of the rubber picking teeth being shown removed from the drum and one end portion of the drum being broken away and shown in section for clearness of illustration;

Fig. 2 is an end elevational view of the drum assembly;

Fig. 3 is an enlarged transverse sectional view with parts broken away showing one of the feather picking teeth positioned on the drum for attachment thereto;

Fig. 4 is an enlarged, fragmentary, longitudinal sectional view taken on the line 4—4 of Fig. 1;

Fig. 5 is a transverse sectional view taken on the line 5—5 of Fig. 4;

Fig. 6 is an enlarged, fragmentary view of the portion of Fig. 1 enclosed in the circle 6;

Fig. 7 is a longitudinal sectional view taken on the line 7—7 of Fig. 6;

Fig. 8 is a transverse sectional view taken on the line 8—8 of Fig. 6;

Fig. 9 is a perspective view of a mounting bracket used to hold the feather picking teeth on the drum;

Fig. 10 is a plan view similar to Fig. 1 but showing a modified drum assembly;

Fig. 11 is an end elevational view of the modified drum assembly;

Fig. 12 is an enlarged, fragmentary, longitudinal sectional view taken on the line 12—12 of Fig. 10;

Fig. 13 is a view taken transversely through the modified drum assembly and illustrating the manner in which the feather picking teeth are mounted on the drum; and Fig. 14 is a transverse sectional view taken on the line 14—14 of Fig. 12.

Although the drum assembly of this invention is adapted primarily for use with feather picking apparatus of the type disclosed in my prior patent hereinabove referred to, it is to be understood that it is not necessarily limited to apparatus of this type. The drum assembly can be used in any capacity where a device or apparatus of this character has utility.

In general, the assembly comprises a cylindrical metal drum 20 which carries on its periphery a plurality of radially extending feather picking teeth 22. The teeth 22 preferably are arranged in rows and the teeth in adjacent rows are arranged in staggered relation to enhance the feather picking action. As suggested, the teeth are separately removable from the drum 20 so that any tooth can be quickly replaced whenever it becomes worn or broken without disturbing any of the other teeth.

More specifically, opposite ends of the drum 20 are closed by transverse end walls 24 and 26 and these walls preferably are cut out, as at 28, to reduce the weight of the assembly. At substantially the centers of walls 24 and 26 are bearings 30 and a drive shaft 32 extending axially through the drum 20 is received in the bearings. Set screws 34 extending radially through the bearings 30 engage drive shaft 32 in the conventional manner to hold the drum 20 fixed on the shaft.

In practice, the projecting terminal portions of drive shaft 32 are mounted for rotation in any suitable supporting structure and provision is made for rotatably driving the same. The supporting structure and drive means shown in my prior patent are satisfactory for this purpose. Manifestly, rotation of drive shaft 32 also effects rotation of the drum 20 and of the feather picking teeth 22 on the periphery of the drum.

The feather picking teeth 22 preferably are made of sponge rubber although hard rubber may be used if desired. In practice, the fowl to be picked is pressed manually against the rapidly rotating teeth 22 and moved about as required to bring all portions of the fowl into engagement with the teeth. Some contact between the fingers and the rubber teeth 22 is unavoidable and sponge rubber teeth are less likely to bruise or otherwise injure the fingers. Moreover, although both sponge rubber and hard rubber teeth will remove feathers from the fowl, the sponge rubber is considerably more efficacious in this respect. Each tooth 22 preferably is generally triangular in side elevation and of substantially uniform width as perhaps best shown in Figs. 4 and 5.

One means for fastening the teeth 22 individually and removably on the drum 20 is shown in Figs. 1–8, which means comprises mounting brackets 36 associated with the teeth 22 and a mounting 38 associated with the drum 20. A mounting or retainer 38 is provided for each tooth 22 and the brackets 36 carried by the teeth are detachably engaged and securely held by the retainers.

In the form of the invention here shown, two brackets 36 are provided at opposite sides of each tooth 22, which brackets have upper horizontally elongated portions 40 which clamp the base portion of the tooth and depending portions 42 provided at the lower edges thereof with laterally extending, oppositely directed flanges 44. The two clamping portions 40 may be fastened to the tooth 22 in any suitable manner, as by means of a bolt 46 and nut 48 (Fig. 4), and the fastening means preferably holds the brackets pressed solidly against the tooth. In practice, brackets 36 should grip the tooth 22 sufficiently tightly so that the latter cannot move or turn independently therebetween. By reason of their elongated structure, the clamping portions 40 reinforce the entire base portions of the teeth and tend to prevent the teeth from rupturing or breaking in use at the point of attachment to the drum 20. To this end, the upper portions 40 of brackets 36 preferably are formed with ribs 50 which project laterally therefrom and are imbedded in the body of the tooth 22.

As suggested, a separate mounting 38 is provided for each tooth 22. Each mounting 38 preferably is made from a single generally rectangular piece of sheet metal by conventional stamping and forming operations, and the finished mounting is spot-welded or otherwise fixed on the periphery of the drum. Conceivably, the mountings 38 could be formed integrally and from the material of the drum; however, this is not feasible from a practical standpoint and for this reason the mountings preferably are formed separately and attached to the drum in the manner shown in the drawing.

Each of the mountings 38 is formed with a pair of laterally spaced substantially parallel raised flanges 52 which preferably are extruded or pressed directly from the retainer plate by conventional shearing and stamping operations. The flanges 52 thus formed define a guideway therebetween. Also, as shown in Fig. 8, the flanges 52 are closed at one end as at 54, and are open at the other end thereof, as at 56. As perhaps best shown in Fig. 7, flanges 52 are integrally joined to the mounting 38 along the outer edges thereof and are open along their inner edges. The flanges 52 should be spaced apart sufficiently to accommodate a tooth 22 and the mounting brackets 36 carried thereby between the confronting inner edges thereof (Fig. 4). Also, the flanges 52 should be raised sufficiently from the plane of the retainer plate to accommodate the lateral extensions 44 thereunder. At the open ends of flanges 52 are downturned or depending lips 58 which engage behind lateral extensions 44 to hold the brackets normally in interlocking engagement with the retainer flanges.

In practice, the mounting brackets 36 are located on the teeth 22 with the lateral extension 44 disposed slightly above the bases of the teeth. Thus, when the teeth are placed on the drum 20, as shown in Fig. 3, preparatory to fastening mounting brackets 36 in the mountings 38 the lateral extensions 44 are disposed slightly above the retainer flanges 52. To attach the teeth they must be pressed downwardly against the drum so that the base portions thereof are compressed and so that the lateral extensions 44 will pass under the retaining lips 58 and then pushed circumferentially on the drum to engage the extensions under flanges 52. Thereafter, the resilient action of the compressed base portion against the drum 20 presses the lateral extensions 44 upwardly solidly against the flanges 52 and prevents the tooth shifting in the retainer during operation of the machine. Manifestly, the above operations are reversed to remove teeth 22.

Reference is now had to Figs. 10–14 which show a modified mounting for the teeth 22. In this form of the invention, mounting brackets 36 identical to those hereinabove described are fastened on each tooth 22, but, in this instance, the brackets are mounted somewhat lower on the teeth since the lateral extensions 44 extend below and interlock directly with the drum 20.

As best shown in Fig. 10, the drum 20 is provided with a pair of spaced, parallel slots 60 for each tooth 22 and two slots in each pair are spaced apart a distance corresponding to the spacing of the two brackets 36 on each tooth. At one end thereof, the slots 60 are enlarged laterally, as at 62, and the enlargements are of a size to accommodate the lateral extensions 44. Adjacent the enlargements 62 are downwardly pressed beads or ribs 64 which extend transversely of the slots 60 and serve the same purpose as the lips 58 in the form of the invention first described. As best shown in Figs. 13 and 14, the beads 64 conveniently can be extruded or pressed directly from the material of the drum.

In practice, each tooth 22 is placed on the drum 20 between a respective pair of slots 60 with the lateral extensions 44 of the mounting brackets 36 carried thereby disposed in enlargements 62, as shown in Fig. 13. It will be observed that, in this position of the tooth 22, extensions 44 lie substantially in the same plane as the drum 20 so that the tooth must be compressed against the drum in order to engage the extensions under the drum. However, when the tooth 22 is pressed solidly against the drum 20 and slid circumferentially in the direction of the arrow in Fig. 13, the extensions 44 are moved under the drum and past the beads 64 to the position shown in Fig. 14. In the latter position of the tooth 22, the extensions 44 are pressed solidly upwardly against the drum by the resilient action of the compressed tooth 22 and the transverse beads 64 prevent the extensions from inadvertently retracting and releasing the drum. As in the form of the invention first described, the teeth are disengaged from the drum by reversing the above operation.

It may thus be seen that I have accomplished the objects of my invention. The drum 20 can be readily made from sheet metal by conventional stamping and forming operation to provide a lightweight but essentially strong and rigid unit, and the individual feather picking teeth 22 can be quickly fastened to or disengaged from the drum. After the teeth 22 have been used for a considerable length of time they become ragged or torn and must be replaced. However, not all the teeth need be replaced at one time. The present invention makes it possible to replace each tooth when necessary without disturbing any other tooth on the drum.

It is to be understood that the forms of the invention herewith shown and described are to be taken as preferred examples of the same and that various changes in the size, shape, and arrangements of parts may be resorted to without departing from the spirit of the invention or the scope of the appended claims.

Having thus described the invention, I claim:

1. In fowl picking apparatus, a plurality of feather picking teeth, a carrier for said teeth, and mountings for fastening said teeth individually on said carrier, each mounting including a pair of individual brackets on opposite sides of and fastened to one of the teeth, said brackets having lateral extensions which project outwardly in divergent relation from opposite sides of the tooth, and retainers on the carrier having portions overlying and in detachable interlocking engagement with said lateral extensions and depending end portions arranged to hold said lateral extensions normally interlocked with said first mentioned portions.

2. The combination as set forth in claim 1 wherein said brackets are removably fastened on the teeth and are provided with upper tooth clamping portions which overlay and reinforce substantially the entire base portions of the teeth.

3. The combination as set forth in claim 1 wherein a retainer is provided for each of said teeth and wherein each retainer comprises spaced substantially parallel flanges which cooperate to define a guide for the two brackets and which overlie the lateral extensions of the respective brackets.

4. The combination as set forth in claim 1 wherein each retainer has spaced substantially parallel flanges which cooperate to define a guideway for the two brackets and are arranged to overlap the lateral extensions of said brackets, said flanges being open at one end and spaced apart sufficiently to permit the lateral extensions of both brackets to be inserted thereunder simultaneously from one end of the guideway.

5. The combination as set forth in claim 1 wherein a retainer is provided for each of said teeth and wherein each retainer has spaced substantially parallel flanges which cooperate to define a guideway, said flanges being open at one end to permit the lateral extensions of both brackets to be inserted thereunder simultaneously from one end of the guideway, and the open ends of said flanges being provided with depending abutments which engage said lateral extensions to prevent inadvertent withdrawal of the brackets from the guideways.

6. In a fowl picking apparatus, a rotatable drum, feather picking teeth on and extending radially from the drum, said teeth having inherently resilient base portions, a mounting on the base portion of each tooth, lateral extensions on said mountings, and retainer means on said drum for each of said mountings, each retainer means having flanges which overlap and interlock with said lateral extensions and openings through which said lateral extensions are inserted for engagement under said flanges, the material of said flanges being formed adjacent said openings with depending lip portions which define abutments engageable with said lateral extensions to hold the latter normally under said flanges, said mountings and said retainers coacting to hold the base portions of the teeth pressed solidly against the drum whereby the base portions of said teeth react to hold the mountings engaged with the retainers.

7. In a fowl picking apparatus, a rotatable drum, feather picking teeth on and extending radially from the drum, said teeth having inherently resilient base portions, and latch means holding each tooth separately and removably fastened to the drum, each latch means comprising a keeper associated with the drum and provided with spaced substantially parallel flanges which are open at one end to define a guideway therebetween, and catch means associated with said tooth, each of said catch means having portions removably engaged under the flange portions of its respective keeper, and said latch means and said catch means coactive to hold the bottom surface of the tooth with which they are associated pressed against the drum, said keepers being open at one end to permit insertion or withdrawal of said catch means and having abutments at the open end thereof engageable with said catch means to hold the latter normally in interlocking relation with said keeper flanges.

FRED HANSHAW.

REFERENCES CITED

The following references are of record in the file of this patent:

UNITED STATES PATENTS

| Number | Name | Date |
|---|---|---|
| 1,800,690 | Leventhal | Apr. 14, 1931 |
| 2,096,319 | Churchill | Oct. 19, 1937 |
| 2,342,013 | Sandlin | Feb. 15, 1944 |